UNITED STATES PATENT OFFICE.

CARLETON ELLIS, OF MONTCLAIR, NEW JERSEY.

PRODUCT CONTAINING HYDROGENATED OIL.

14,568. Specification of Reissued Letters Patent. Reissued Dec. 17, 1918.

No Drawing. Original No. 1,276,509, dated August 20, 1918, Serial No. 227,770, filed April 10, 1918. Application for reissue filed October 26, 1918. Serial No. 260,535.

*To all whom it may concern:*

Be it known that I, CARLETON ELLIS, a citizen of the United States, residing at Montclair, in the county of Essex and State of New Jersey, have invented certain new and useful Improvements in Product Containing Hydrogenated Oil, of which the following is a specification.

This invention relates to a composition of matter containing normally solid hardened or hydrogenated oil preferably of fairly high melting point combined or incorporated with a solid non-fatty material preferably a ground, pulverized, comminuted, finely-divided or pulverulent organic or inorganic filling or extending material.

The present application constitutes a continuation in part of matter disclosed in my copending applications Serial No. 740,416 filed January 6, 1913, renewed Aug. 1, 1916, Serial No. 112,614; and Serial No. 163,738 filed April 21, 1917.

In preparing the composition forming the subject matter of the present invention for example, I catalytically hydrogenate an oil such as a semi-drying oil of the nature of cottonseed oil or a mixture of this oil with corn oil until the iodin number is reduced to say approximately 30 or 40, and preferably until it is reduced to 25 or below. This furnishes a fatty base with which is incorporated the filling or extending material. The invention is not restricted to the oils above mentioned as other oils either animal oils (including fish oils) or vegetable oils all of these being classified as fatty oils, especially the semi-drying oils may be employed including menhaden, cod, cod-liver, whale, almond, castor, olive, soya bean, peanut, linseed and Chinese wood oil; also lard, tallow and other greases and oils. The invention also contemplates the employment of various mixtures of these oils in addition to the specific mixture above noted. For example castor and whale oil or castor and cottonseed or peanut and cocoanut oil may be mixed and hydrogeneated.

Neither is the present invention limited to the iodin number noted. While hydrogenation is preferably carried to a point where the iodin number of the oil or oil mixture is reduced well below 50 or even to an iodin number of 25 or less, in some cases hydrogenation may not be necessarily carried to this point but may be stopped even while the iodin number is as high as or somewhat over 50 affording a product that is normally of a solid character, that is which at ordinary room temperature is not of a liquid nature. However, it is desirable to carry the hydrogenation to a point at which a fat with an iodin number of below 50 is produced, as this treatment tends to sufficiently free the oil from any material amounts of components having siccative or drying properties as to prevent or substantially retard the normal tendency of the original oil to become rancid when exposed with carriers, filling or extending material in such a way that the air has free access. Hydrogenation to an iodin number of below 50 renders the material less susceptible to atmospheric influences and the highly hardened product shows a remarkably good resistance to aging which is not exhibited by non-hydrogenated oils of the nature of cottonseed oil or similar vegetable oils or animal oils such as common soap tallow. Hydrogenated cottonseed oil having a melting point between 55 and 62° C. is a desirable ingredient of the composition. It may be the sole fatty material present or it may be a component of the fatty composition, being mixed with other hydrogenated or unhydrogenated oils to such an extent as may be desired.

In preparing a hydrogenated fatty oil suitable for the present purpose the hydrogenation process may be carried out in the manner known to the art, as for example by treatment of the oil with hydrogen in the presence of a nickel catalyst, present to the extent of, say, one-half of one per cent., or a less amount of palladium catalyzer, the temperature being held by preference between 150 and 200° C. in the presence of hydrogen gas. The progress of hydrogenation may be watched by the increase in melting point or decrease in iodin number and is stopped at the desired point. In order to render the fat suited for many purposes of the present invention it is necessary to carefully remove the catalyzer which may be done by filtration of the melted material. Ordinary filtration in filter presses may give a clear oil containing minute traces of dissolved catalyzer, as for example nickel, but such traces are of no consequence for most purposes of the present invention. When even these traces require to be removed special treatment may be had for the purpose, such for example as is indicated in Patent No. 1,224,291, May 1, 1917; or in any other suitable manner.

The products of my present invention may take either of two forms, viz.—(1) a solid cake or solid or semi-solid coherent mass and (2) a ground, comminuted or pulverulent form. The solid cake or coherent mass may be used for a variety of purposes such as buffing and grinding, lubricating, polishing purposes and the like. In the case of a buffing composition, a suitable polishing or abrasive powder such as crocus, Indian red, whiting, etc., may be used with the fatty material, while for grinding purposes carborundum, emery and the like may be employed. The proportion of the polishing or abrasive powder will depend on the relative weight of the latter compared with the fatty material, usually the maximum quantity being added which will give a firm solid cake. This amount will vary, depending on the materials.

The product may be made up by melting the hydrogenated oil obtained as above indicated or in any other suitable manner, adding the polishing or abrasive powder, stirring well or mixing in a pug-mill or casting in molds of the desired shape; in a similar manner a lubricating solid made up of graphite or graphite and talc with hydrogenated oil may be prepared. A tailor's chalk may be made by incorporating talc or starch with hydrogenated cottonseed oil of melting point of 60° C. using for example, approximately 10 parts of hydrogenated cottonseed oil to 4 parts of talc or like amount of starch. In the same way the hydrogenated oil may be incorporated with wood-flour, saw-dust and other organic or inorganic powders, filling or extending materials, the proportions being such as to produce a solid cake, plastic or coherent mass according to the consistency desired.

In the second form of the invention the hydrogenated oil is in a powdered or comminuted condition and is admixed with filling and extending materials to produce a pulverulent product. For example hydrogenated peanut, corn or cottonseed oil which has an iodin number of say 10 to 20 and a melting point of 59 or 60° C., or higher, is ground to a fine powder and admixed with the filling or extending material. For example, equal weights of the ingredients may be used or an excess of the extending materials, as for example, 5 or 10 times more of the latter than the fatty material. Or even in some cases, at least 100 times as much according to the nature of the product required. Thus by grinding hydrogenated cottonseed oil to fine powder and mixing with 5 to 10 parts of ground talc, a product may be obtained which may be used as a foot powder or shoe powder for use by the shoe merchant, etc. In another case a talcum powder for toilet purposes may be made by the addition of 3 to 5% of hydrogenated cottonseed oil of melting point of 59 or 60° C., such hydrogenated product serving to replace in whole or part the zinc stearate commonly used in talcum products of this character. Or a mixture of hydrogenated oil and zinc stearate may be used with talc if desired. Instead of grinding the hydrogenated oil it may be melted and solidified in contact with more or less of the powdered talc which is then ground up and used as such or in admixture with other filling or extending materials.

A lubricating powder may be made by melting say equal weights of hydrogenated oil and graphite, cooling and grinding to a powder. This material may be used in a powder-gun, as a lubricant for the leaves of automobile springs and the like or in places which are inaccessible to ordinary lubricating oils or fats. In applying this material the leaves of the springs are pried apart slightly and the powder blown in between the leaves. In like manner a lubricating product of talc and hydrogenated oil or talc, graphite and hydrogenated fat may be prepared.

By mixing the hydrogenated fat with a suitable abrasive a grinding powder may be obtained and by the use of a polishing powder a polishing composition may be secured. Barytes terra alba, clay and other mineral fillers, carriers or extending agents may be employed, all in a suitably comminuted or powdered or impalpable condition, depending on whether or not the material is to be used for grinding, buffing, polishing purposes or as a lubricant. In the latter case of course it is important to have the composition free from gritty or hard particles and preferably the filling material should have a flour-like texture, such as is afforded by talc or graphite or any other similar material of an inorganic or organic character. Material having a smooth substantially unctuous feel is preferred for lubricating purposes.

Thus the composition of the present invention involves the use of the hydrogenated oil of any suitable consistency preferably being hard and brittle, incorporated with filling and extending materials such as have been indicated in an illustrative manner. The hydrogenated oil may be derived in any suitable manner or from any suitable source. The composition thus produced is adapted to a great variety of uses and modifications. In addition to the type of products above mentioned, the invention also contemplates the employment of organic materials which may be of an edible character, as for example a mixture of hydrogenated oil and carbohydrates. For instance hydrogenated oil may be melted and incorporated with a relatively large proportion of sugar say 10 to 20 parts of the latter to 1 part of the hard fat, giving a sweetening material which also contains a fatty body distributed throughout its mass, which product is suitable for cooking and table purposes. In like manner hydrogenated oil may be incorporated with starch or casein to form a product suited for cooking purposes. In the case of starch, by the use of a relatively small amount of hydrogenated oil, say 3 to 10%, a starch is obtained which may be used for laundry purposes, the high melting point hydrogenated oil being adapted to lend a luster to the finished goods and to enable the ironing operation to be carried out smoothly, while at the same time the fat does not tend to become rancid in the laundered goods and thus give them an objectionable odor.

A sweetening composition may be made from cane sugar and hydrogenated peanut oil in the proportion of 9 lbs. of sugar to 1 lb. of oil.

As in my copending applications above referred to, waxes, resins, metallic soaps, pitches and other plastic substances may also be added, if desired, in suitable quantity. When added material of this character is miscible with the hydrogenated oil, the latter is duly modified by the presence of such an ingredient. When the added material, such for example as a metallic soap is not readily miscible or soluble in the hydrogenated oil when the latter is melted or after melting and solidifying such product acts simply as a filling or extending material. Generally speaking, the carrier or filling material employed is of an inert character, that is has no substantial action on the hydrogenated oil so that when admixed no reaction occurs causing any material change in the hardened fat other than the physical change due to its distribution among or over the particles of filling or extending material.

In some cases it is possible to use the powdered material as an insecticide or when the hydrogenated oil is incorporated with barium carbonate, or other suitable poison, the product may be used in the solid or powdered form as a poison for rodents.

A feature of the present invention is the use of a substantial amount of filling or extending material, preferably at least equal to the amount of fatty material employed and in many cases exceeding the amount of fatty material, many times or even many hundred times, so that the fatty product constitutes the minor ingredient and the filling or extending material the major, as expressed in parts by weight.

What I claim is:

1. A composition of matter comprising a minor proportion of hydrogenated fatty oil which is solid at normal temperature in intimate admixture with a major proportion of an impalpable non-fatty inert solid material.

2. A composition of matter comprising a major proportion of comminuted non-fatty solid material and a minor proportion of hydrogenated fatty oil solid at normal temperature solidfied in contact therewith.

3. A composition of matter comprising hydrogenated fatty material intimately mixed with powdered abrasive material.

4. A composition of matter comprising a powder containing hydrogenated cottonseed oil and non-fatty comminuted solid material.

5. A composition of matter comprising a powder containing a hydrogentated fatty oil in intimate admixture with a comminuted non-fatty solid material.

6. A composition of matter comprising a mixture of at least two hydrogenated fatty oils having an iodin number less than 50 in intimate admixture with comminuted non-fatty solid non-catalytic material.

7. A composition of matter comprising a fatty oil hydrogenated to an iodin number of below 50, incorporated with comminuted non-fatty solid material, said hydrogenated oil being substantially free of catalyzer.

8. A composition of matter comprising a semi-drying fatty oil hydrogenated to an iodin number of below 50 and being substantially free from siccative bodies, incorporated with a comminuted non-fatty material, such material being substantially free from catalyzer.

9. A composition of matter comprising fatty oil hydrogenated to an iodin number of below 50, incorporated with at least 40% of its weight of finely-divided non-fatty solid material.

10. A composition of matter comprising a non-fatty, non-catalytic solid material and hydrogenated oil, solid at normal temperature and substantially free of hydrogenating-catalyzer, solidified in contact therewith.

11. A composition of matter comprising catalytically-hydrogenated fatty oil which is solid at normal temperature and is at least substantially freed of the catalytic body used to hydrogenate said oil, admixed with an influential proportion of finely-divided inert non-fatty extending material, substantially devoid of catalytic.

12. A shaped product composed of a composition of matter comprising as essential constitutents, hard hydrogenated fatty oil and a comminuted non-fatty solid material.

13. A composition of matter comprising a mixture including a hydrogenated oil non-liquid at ordinary room temperature, and a non-fatty solid material devoid of catalytic properties.

CARLETON ELLIS.